UNITED STATES PATENT OFFICE.

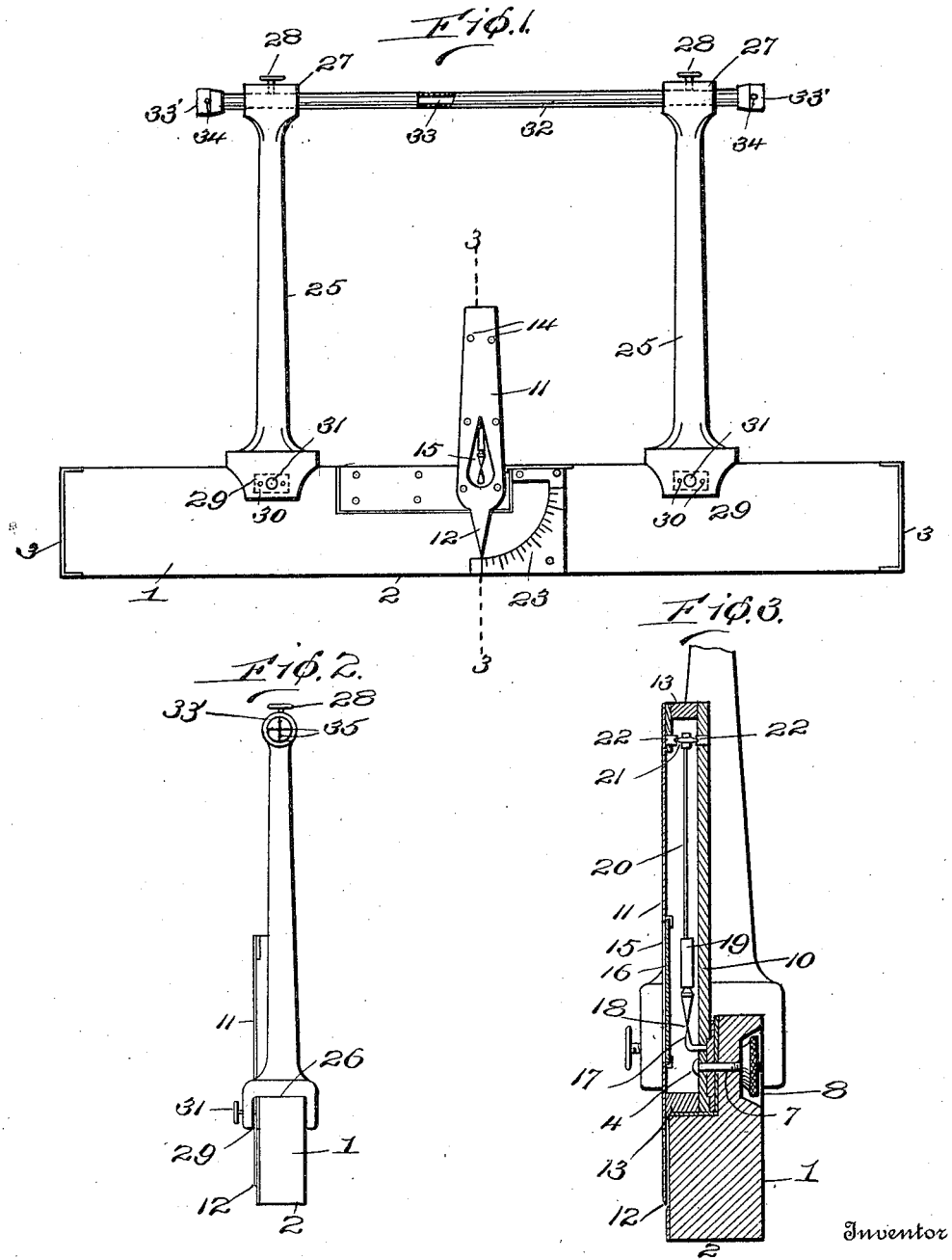

EDWIN GUY ADAMS, OF BELLAIRE, OHIO.

SURVEYOR'S INSTRUMENT.

999,538.

Specification of Letters Patent.  Patented Aug. 1, 1911.

Application filed May 26, 1910.  Serial No. 563,628.

*To all whom it may concern:*

Be it known that I, EDWIN GUY ADAMS, a citizen of the United States, residing at Bellaire, in the county of Belmont and State of Ohio, have invented new and useful Improvements in Surveyors' Instruments, of which the following is a specification.

My invention relates to improvements in surveyors' instruments, and the leading object of my invention is the provision of an improved device adapted for use in determining grades or for other work of a like character wherein it is desired to project an imaginary line from a point at a certain angle or to determine the horizontal angle of such a line when drawn between two points.

A further object of the invention is the provision in an instrument of this character of means which may be employed for readily determining the inclination of beams or other articles and which is so constructed and adjustable as to be capable of use either as a level or a plumb.

Another object of the invention is the provision in connection with said combined plumb and level of improved means for determining the line whose angle is to be measured with the greatest exactitude, which means shall be simple and durable of construction and shall be composed of strong parts not liable to be readily damaged and which shall also be interchangeable.

To attain the desired objects, my invention comprises a combination plumb and level having a frame adjustably secured thereto bearing means for sighting or determining a line, the invention further residing in the novel features of construction and combination and arrangement of parts for service substantially as hereinafter described and as illustrated in the accompanying drawings.

Figure 1 represents a side elevation of my complete instrument. Fig. 2 represents an end elevation thereof, and, Fig. 3 represents a vertical sectional view through the sighting tube and plumb taken on line 3—3 of Fig. 1.

In the drawings, in which similar characters of reference are employed to denote corresponding parts throughout the several views, the numeral 1 indicates the base block of the device having the lower straight edge 2 and being preferably formed from wood with metal end facing plates 3, although any suitable material may be employed as the base. Formed in the upper portion of said base 1 is a pocket or recess 4.

Projecting rearwardly through the wall of the pocket is a bolt 7 having a thumb-nut 8 engaged on its outer end for securing the same, while pivotally mounted upon said bolt and adapted to be contained within the recess is my plumb or leveling member. Said member as will be clearly understood by reference to Fig. 3 comprises a main supporting plate 10 which is mounted on the bolt 7, and a front section 11 having a lug or extension 12 tapering to a point and adapted to serve as an indicator. Inserted between the said plates at their edges are the spacing blocks 13, screws 14 passing through said blocks and securing the two plates together in proper spaced relation.

Formed in the front plate 11 of my plumb is a sight opening 15 preferably provided with a transparent covering 16, while secured to the plate 10 and projecting into said opening is a pointer or indicator 17 adapted when the plumb 9 is in vertical position to be in alinement with the point 18 of the plumb bob 19, said bob being supported by the rod 20 depending from the pivot shaft 21 having its ends journaled in sockets in the ends of the adjustable pivot bearings or screws 22 secured in the front and rear plates.

From the above it will be seen that I have provided for my instrument an improved form of plumb, and on the face of the block 1 I provide a segmental scale 23 adapted to register with the pointer 12 to indicate the angle that the plumb makes with the basal edge 2 of the block, said scale being marked to indicate from 90° when the plumb and block are at right angles with the former in raised position to 0° when the plumb is lying in the recess or pocket 4. This construction can be employed either as a level, the block being placed upon the surface to be tested and the plumb 9 swung until the bob and the registering pointer therefor are in alinement, or the plumb may be swung into the recess and in such position employed to a limited extent as a plumb.

When it is desired to employ my device as a surveying instrument, that is, to determine or lay out imaginary lines at certain angles, I mount on the base block 1 near each end the supporting posts 25 having bifurcated portions 26 spanning the block, said posts terminating at their upper ends in sleeves 27 having set screws 28 engaged in their upper portion. Secured to the bifurcated portions 26 of the posts are plates 29 held in place by rivets or like fastenings 30, said plates having threaded sockets formed therein in which are engaged set screws 31 for engaging the block to adjustably secure the posts in position thereon.

Mounted in the bore of the sleeves 27 and connecting the sleeves of the two posts is a tubular member 32 having a bore 33 adapted to lie exactly parallel to the basal face 2 of the block 1, while mounted on each end of the tube is one of my improved line determining devices, said device consisting of an outer sleeve 33' having a portion fitting over the end of the tube and secured thereon by the locking screws 34, while contained within the sleeve are the longitudinal or horizontally disposed wires 35, the wires at opposite ends being brought into alinement with each other and with the object to be tried when the instrument is in use in much the same manner that a rifle is sighted, when the instrument is in correct position the plumb being adjusted until the bob is in alinement with its pointer, when the lug of the front plate will indicate the horizontal angle of the tube, while when it is desired to have the tube at the same angle for a time, I lock the plumb at said angle through the medium of the bolt 7 and thumb-nut 8, it then being merely necessary to move the instrument until the bob and pointer are in alinement. When the plumb is out of use it can be swung down and confined by the pocket 4 as is apparent.

From the foregoing description taken in connection with the drawings the construction and use of my instrument will be readily understood and its advantages be fully appreciated and it will be seen that I have provided a strong, simple, durable and inexpensive instrument of the greatest efficiency, having practically no fragile parts, and which can be packed into small space and readily assembled for use.

I claim:

1. A leveling device, comprising a supporting block having a recess formed therein, a plumb level pivoted to the block and foldable into said recess, a support at each end of the block having a bifurcated lower end spanning the block and having a set screw engaged in one of the bifurcated portions and clampingly engaging the block for securing the support in adjusted position, said supports having eyes formed in their upper ends, a tube engaged in said eyes, clamping screws carried by the supports and engaging the tube for securing the tube in position, and removable sighting members mounted on the ends of the tube.

2. The combination with a base bearing a leveling device, of a knock-down sighting device mounted on the base, said device comprising supports having one end bifurcated and the other end provided with a cylindrical passage, thumb screws carried by the bifurcated ends and engaging the base to secure the supports thereto, the bifurcated portion spanning said base, a sighting tube mounted in the passages, means carried by the supports for clampingly engaging the tube to secure it in position, and sighting members removably mounted on the ends of the tube.

In testimony whereof I have hereunto set my hand in presence of two subscribing witnesses.

EDWIN GUY ADAMS.

Witnesses:
JOHN L. T. TRAVERS,
WILLIAM S. BOSWELL.